No. 691,081. Patented Jan. 14, 1902.
H. P. STROH & J. HUTCHISON.
STONE PULLER.
(Application filed Aug. 21, 1901.)
(No Model.)
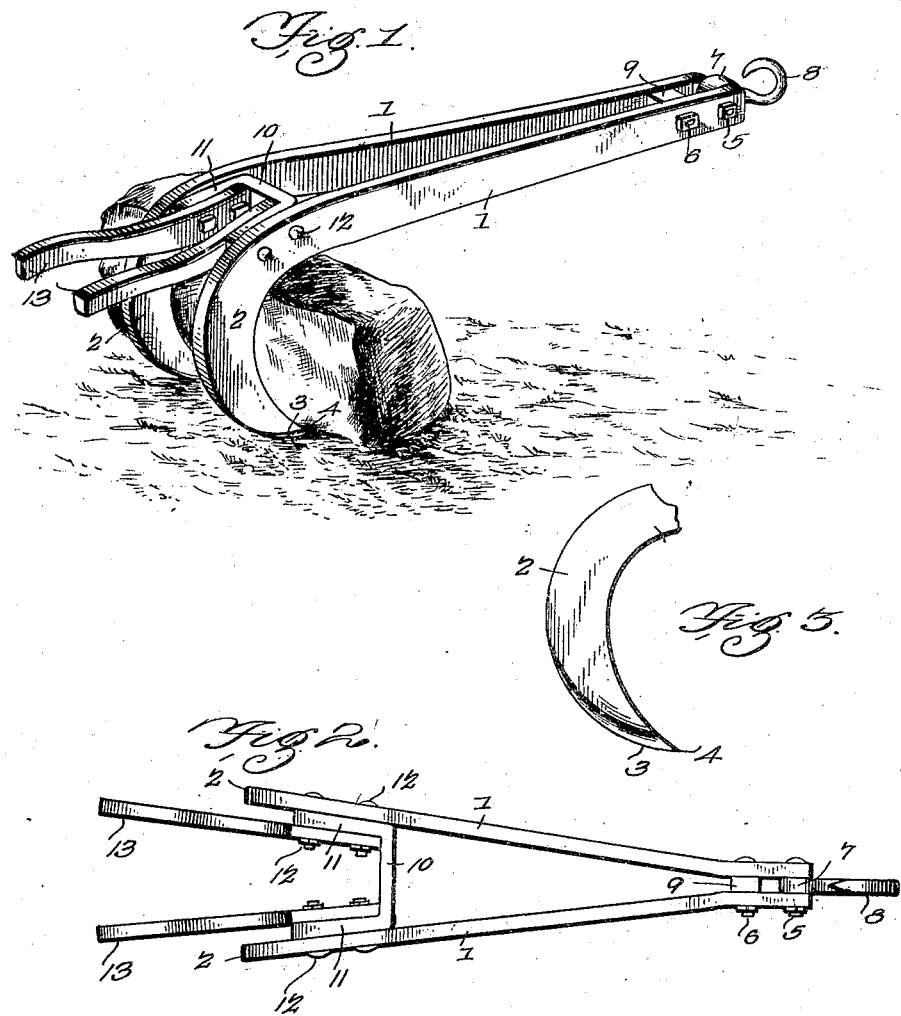

UNITED STATES PATENT OFFICE.

HENRY P. STROH AND JAMES HUTCHISON, OF SANBORN, NORTH DAKOTA.

STONE-PULLER.

SPECIFICATION forming part of Letters Patent No. 691,081, dated January 14, 1902.

Application filed August 21, 1901. Serial No. 72,840. (No model.)

*To all whom it may concern:*

Be it known that we, HENRY P. STROH and JAMES HUTCHISON, citizens of the United States, residing at Sanborn, in the county of Barnes and State of North Dakota, have invented a new and useful Stone-Puller, of which the following is a specification.

Our invention is an improved stone-puller adapted for use in removing stones from a field; and it consists in the peculiar construction and combination of devices hereinafter fully set forth and claimed.

In the accompanying drawings, Figure 1 is a perspective view of a stone-puller constructed in accordance with our invention. Fig. 2 is a top plan view of the same. Fig. 3 is a detail elevation of one of the downturned hooks.

In the embodiment of our invention we provide a pair of beams 1, which are preferably made of steel or iron and are each provided at its rear end with a downturned forwardly-curved hook 2. The lower ends or points of the hooks are beveled on their outer sides, as at 3, to form the points 4, which are adapted to be readily pressed downwardly in the soil to enable the same to run under a stone which is embedded or partly embedded in the soil. The said beams are connected together at their front ends, diverge rearwardly, and the hooks 2 thereof are disposed abreast of each other. The front ends of the beams are connected together by bolts 5 6. The bolt 5 passes through an eye 7 at the rear end of a draft-hook 8, hence pivotally connecting the rear end of the draft-hook to the implement, and the bolt 6 passes through a space-block 9, which, together with the eye or rear end of the draft-hook, is interposed between the front ends of the beams. A U-shaped bar 10, which is preferably made of steel or iron, connects the said beams together at their rear ends at the points where the hooks 2 turn downwardly from the beams. The arms 11 of the said U-shaped bar extend rearwardly and bear against the inner sides of the said beams at the portions thereof forming the upper ends or bases of the downturned hooks and are connected to the beams by bolts 12. The said bolts also serve to secure the front ends of a pair of rearwardly-extending downwardly-inclined handles 13 to the inner sides of the said arms 11 of said bar 10. The said handles 13 are relatively short, extend downwardly, and project rearwardly from the beams to enable the operator to readily apply his weight to the rear end of the implement in manipulating the same to engage the hooks 2 thereof against and under the rear side of the stone and to embed the points 4 in the earth under the stone, so that the draft of the team or horse harnessed to the implement will cause the same to exert sufficient leverage to lift the stone from its bed. The implement, with the stone disposed transversely across the hooks 2 on the front sides thereof, as shown in Fig. 1, may be then readily drawn to the point where it is desired to deposit the stone.

A stone-puller thus constructed is exceedingly strong, cheap, simple, and serviceable, and by its use a field obstructed by large stones on or near the surface may be readily cleared.

Having thus described our invention, we claim—

A stone-puller comprising a pair of rearwardly-diverging beams having their front ends connected together and their rear ends formed into downwardly-extending, forwardly-curving hooks, disposed abreast of each other, a U-shaped bar disposed between the said beams near the rear ends thereof, the said U-shaped bar having its arms extended rearwardly and bearing against the inner sides of said beams, a pair of rearwardly-extending downwardly-inclined handles having their front portions bearing against the inner sides of said rearwardly-extending arms of said U-shaped bar, and bolts passing through said beams, said arms of said bar and said handles, and securing the same together, substantially as described.

In testimony that we claim the foregoing as our own we have hereto affixed our signatures in the presence of two witnesses.

HENRY P. STROH.
JAMES HUTCHISON.

Witnesses:
F. E. CORSON,
WILLIAM MUKE.